(12) United States Patent
Massaro et al.

(10) Patent No.: US 8,552,985 B2
(45) Date of Patent: Oct. 8, 2013

(54) KEYBOARD ILLUMINATION

(75) Inventors: Kevin Massaro, Houston, TX (US); Craig Brown, Cypress, TX (US); Lee Warren Atkinson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

(21) Appl. No.: 13/149,006

(22) Filed: May 31, 2011

(65) Prior Publication Data

US 2012/0306751 A1 Dec. 6, 2012

(51) Int. Cl.
*G06F 3/02* (2006.01)
(52) U.S. Cl.
USPC .............. 345/168; 341/22; 708/142

(58) Field of Classification Search
USPC .............. 345/168; 341/22; 708/142
See application file for complete search history.

(56) References Cited

U.S. PATENT DOCUMENTS

| | | | |
|---|---|---|---|
| 7,372,371 B2 | 5/2008 | Bear et al. | |
| 2005/0073446 A1* | 4/2005 | Lazaridis et al. | 341/22 |
| 2007/0002210 A1* | 1/2007 | Ho et al. | 349/61 |
| 2007/0018961 A1* | 1/2007 | Jeong | 345/170 |
| 2007/0025097 A1* | 2/2007 | Cheng | 362/85 |
| 2009/0015602 A1* | 1/2009 | Rumreich et al. | 345/690 |
| 2010/0306683 A1* | 12/2010 | Pance et al. | 715/764 |

* cited by examiner

*Primary Examiner* — Lixi C Simpson
(74) *Attorney, Agent, or Firm* — Robert McDowell

(57) ABSTRACT

Embodiments provide methods, apparatuses, and systems for illuminating a plurality of keys. The keys are illuminated in accordance with pattern. In various embodiments, the illumination of the keys is in response to a display control signal.

20 Claims, 7 Drawing Sheets

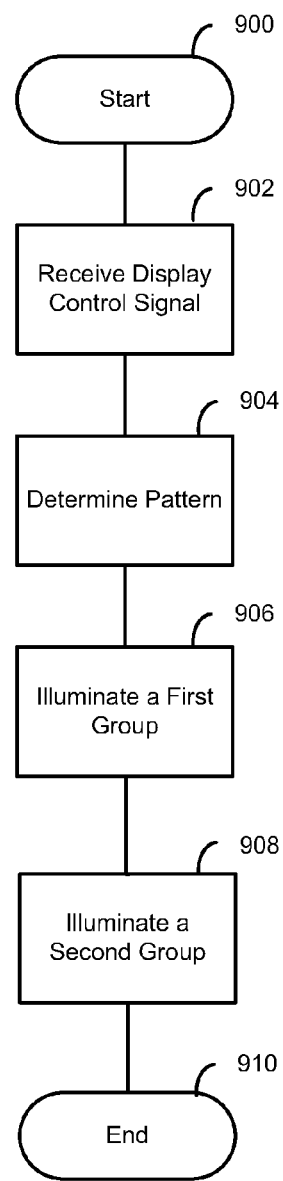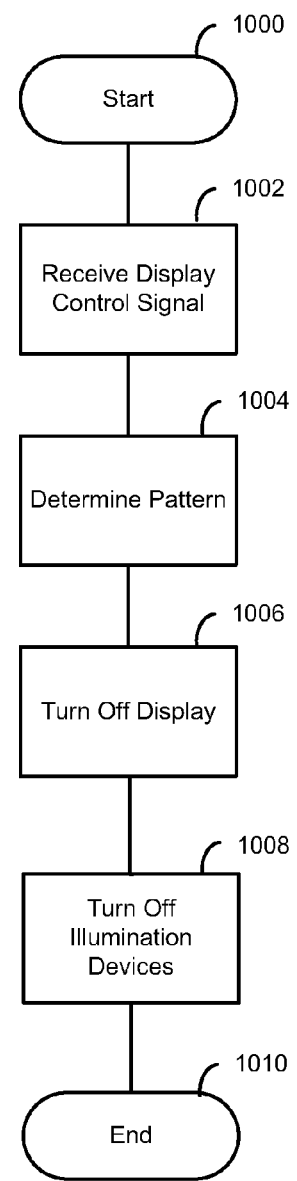
Figure 9
Figure 10

KEYBOARD ILLUMINATION

BACKGROUND

Computing systems utilizing a keyboard or keypad as a peripheral device may incorporate a backlight. The backlight may facilitate use of the keyboard in low light environments.

BRIEF DESCRIPTION OF THE DRAWINGS

FIGS. 7-12 illustrate example flow diagrams in accordance with the present disclosure.

DETAILED DESCRIPTION

Keyboards and/or keypads utilized with computing devices such as, but not limited to, notebook computers, desktop computers, and mobile devices may utilize a backlight to facilitate their use in low light environments. The backlights may use a minimum number of illumination devices, generally three or four, along with a light guide to illuminate the keys of the keyboard and/or keypad. While using a minimum number of illumination devices may enable power savings, it may also impede marketability of the computing device and customization of the computing device.

In the present disclosure, methods, apparatuses, and systems are disclosed which utilize a plurality of illumination devices individually coupled to a plurality of keys, in a one-to-one architecture. This architecture enables effective illumination of individual keys within a keyboard and/or keypad. Additionally, the methods, apparatuses, and systems include various components which enable the illumination devices to produce a pattern visible on the keys of the keyboard. The pattern produced by the plurality of illumination devices may incorporate the illumination of the display and intuitively convey various states of the computing system. The use of patterns and fully illuminated keyboards and/or keypads may effectively improve a user experience.

Figure 1:
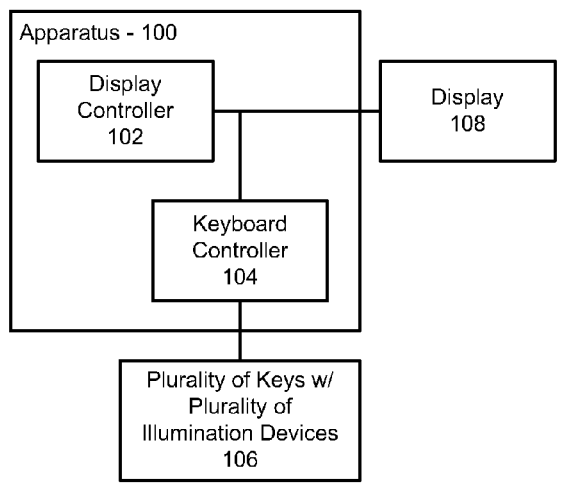
FIG. 1 illustrates an example apparatus in accordance with the present disclosure.

Referring to FIG. 1, an example apparatus is illustrated in accordance with the present disclosure. The apparatus 100 includes a display controller 102 and a keyboard controller 104. The display controller 102 may be coupled to a display 108 while the keyboard controller 104 may be coupled to a keyboard having a plurality of keys with a plurality of illumination devices correspondingly coupled to the plurality of keys. In various examples, the apparatus 100 may be a computing device such as, but not limited to, a desktop computer, a notebook computer, a netbook, a smart phone, a mobile device, or any other device capable of communicating with a keyboard and/or keypad. A keyboard and/or keypad, as used herein, may refer to any component having a plurality of keys and which may be utilized as an interface to a computing device.

The display controller 102 may be a component capable of controlling a display 108. For example the display controller 102 may receive a signal and control a backlight of a display 108 in accordance with the signal. The display controller 102 may turn on and off the display 108, wherein turning on and off the display refers to illuminating and darkening of the backlight of the display, in examples where the display 108 includes a backlight. In cases where the display 108 does not include a backlight, the display controller may control other aspects of the display in a manner that enables a user to view and interact with the computing device. The display controller 102 may be a controller that includes multiple components including memory and processors. Alternatively, the display controller 102 may be an application specific integrated circuit (ASIC), or a processor that executes instructions to enable the apparatus 100 to perform various operations.

The keyboard controller 104 is a component capable of controlling a keyboard having a plurality of illumination devices individually coupled to a plurality of keys (collectively illustrated as 106). Illumination devices are devices configured to illuminate in response to a received signal or current. Examples of illumination devices include light emitting diodes (LEDs), light emitting capacitors (LECs), or other electroluminescent devices. Keys are individual buttons or keys of a keyboard or keypad. The keys correspond to one or more characters and may include a transparent outline of a character to enable an illumination device to illuminate the character. Similar to the display controller 102, the keyboard control 104 may be a controller that includes multiple components including memory. Alternatively, the keyboard controller may be an ASIC or a processor that executes instructions to enable the apparatus 100 to perform various operations.

In the illustrated example, the display controller 102 is to control the display 108 with a display control signal. The display control signal may turn on or off the display 108. The keyboard controller 104 is coupled to the display controller and is to control the plurality of illumination devices individually coupled to the plurality of keys to produce a pattern based on the display control signal. A pattern may be produced based on a predefined sequence in which the plurality of illumination devices are either illuminated or darkened. The pattern may be generated by illuminating or darkening individual illumination devices that are individually coupled to a plurality of keys, or alternatively, illuminating or darkening groups of illumination devices. The pattern, in various examples, may be synchronized and incorporate the illumination or darkening of the display 108.

In one example, the display controller 102 may transmit a display control signal to the display 108. The keyboard controller 104, via a coupling to the display controller 102, may receive the display control signal and control the plurality of illumination devices individually coupled to a plurality of keys to produce a pattern in response to the display control signal. The pattern may comprise an illumination of a first group of the plurality of keys followed by an illumination of a second group of the plurality of keys. This illumination of the first group and the second group may produce a visual image corresponding to a wave of light moving up, down, or across the plurality of keys. In one example, the first group may comprise a first row of keys on the keyboard and the second group may comprise a second row of keys on the keyboard. The pattern may include additional groups of keys, for example a third row of keys. The groups of keys may also include multiple rows of keys.

In another example, the keyboard controller 104 may control the plurality of illumination devices to produce a pattern based on the display control signal by altering a brightness of the plurality of illumination devices. That is, the pattern may comprise a brightness alternation of a first illuminated group of the plurality of keys followed by a brightness alternation of a second illuminated group of the plurality of keys. The brightness alternation may include dimming or brightening of the illumination devices and consequently their corresponding keys.

The example illustrated in FIG. 1 may produce a pattern in which the illumination devices are illuminated and darkened in response to the display control signal. Consequently, when the display is illuminated a pattern may be produced, and when the display darkens a pattern may be produced. The patterns may be similar or different.

Figure 2:
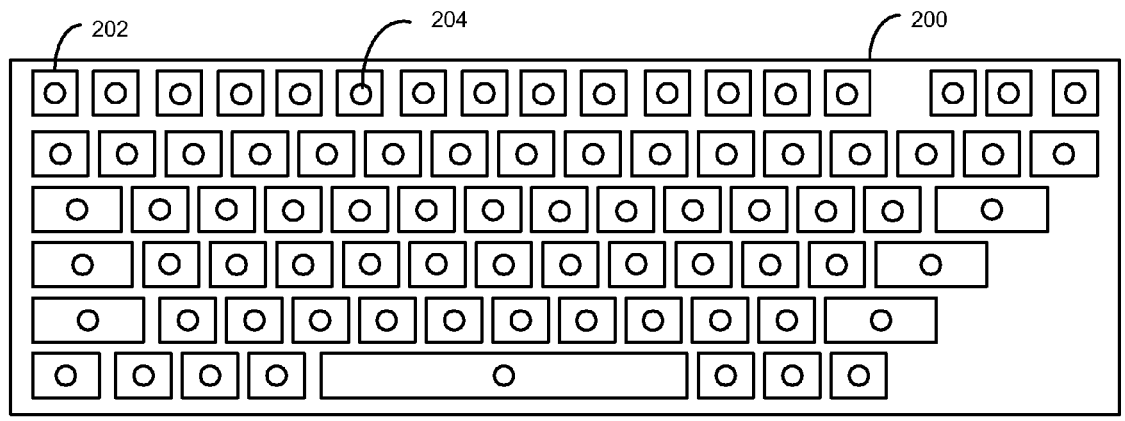
FIG. 2 illustrates an example keyboard in accordance with the present disclosure.

Referring to FIG. 2, an example keyboard is illustrated in accordance with the present disclosure. Keyboard 200 includes a plurality of keys 202 individually coupled to a plurality of illumination devices 204. The keyboard 200 may be a keyboard associated with computing devices such as desktop computers and notebook computers. Alternatively, keyboard 200 may be a customizable keyboard wherein various keys are assignable and arranged in varying manners. Keys 202 may be associated with one or more characters or symbols. Illumination devices 204 may be LEDs, Organic LEDs (OLEDs), or other electroluminescent devices. The illumination devices 204 may be configured to illuminate the characters displayed on the keys 204 from within the keyboard 200. Other types and configurations of keyboard are contemplated. For example, a keyboard associated with a mobile device may also be utilized in accordance with the present disclosure.

Figure 3:
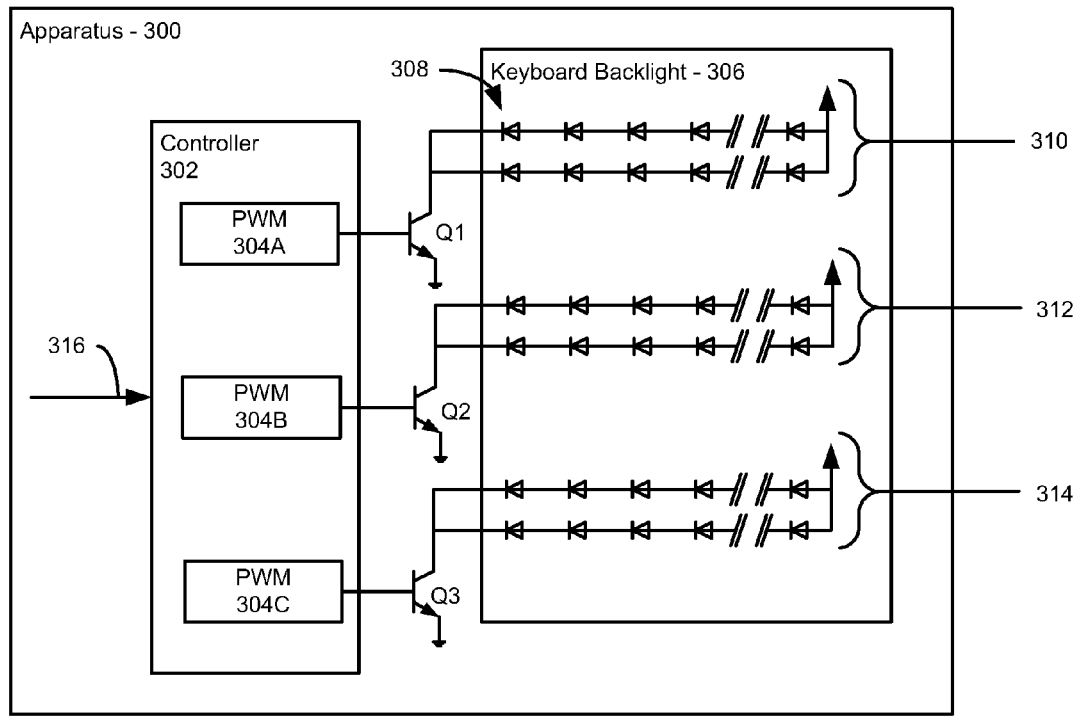
FIG. 3 illustrates an example apparatus in accordance with the present disclosure.

Referring to FIG. 3, another apparatus is illustrated in accordance with the present disclosure. The apparatus 300 includes a controller 302 having pulse width modulators (PWMs) 304A-C, a keyboard backlight 306 having illumination devices 308, and transistors Q1-Q3 coupling the PWMs 304A-C to illumination devices 308. The controller 300 may be a controller suitable for use as a keyboard controller as illustrated in FIG. 1. The controller 300 is to control the plurality of illumination devices 308 that are individually coupled to a plurality of keys (not illustrated) to produce a pattern. As illustrated, thirty illuminating devices are included in the Figure; more or fewer devices may be utilized without deviating from the scope of the disclosure.

The controller 302 may receive a signal 316, from for example, a display controller to illuminate or darken a display. Based on the display control signal 316, the keyboard controller may produce a pattern with the plurality of illumination devices 308. The controller 302 may control each of the PWMs 304A-C. The PWMs 304A-C may control transistors Q1-Q3, turning them off and on according to the cycle of the PWMs 304A-C. When turned on, the transistors may provide a path to ground through each of the illumination devices 308, thereby turning them on. This may generate a pattern based on the groupings of the illumination devices 308. For example, the illumination devices, as illustrated, are in first, second, and third groups 310, 312, and 314, respectively. The individual groups 310, 312, 314 include rows of keys that may be turned on at varying times and intervals, thereby generating a pattern.

Figure 4:
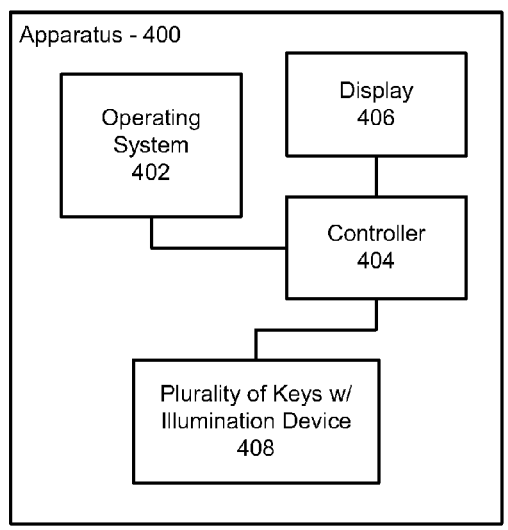
FIG. 4 illustrates an example apparatus in accordance with the present disclosure.

Referring to FIG. 4, another example of an apparatus is illustrated in accordance with the present disclosure. The apparatus 400 includes an operating system 402 coupled to a controller 404. The controller 404 is coupled to a plurality of keys individually coupled to an illumination device (collectively illustrated as 408), and a display 406. In contrast to FIGS. 1 and 3, the controller 404 of FIG. 4 may control both the display 406 and the illumination device coupled to the plurality of keys 408. This may enable integration of the display light into a pattern, and/or alteration and delay of the display control signal in accordance with the pattern.

The controller 404 may comprise various components such as memory and processors. Alternatively, the controller 404 may be an ASIC configured to perform predefined functions or a processor capable of executing instructions stored on a tangible computer readable medium to enable the apparatus 400 to perform operations. The controller 404 is to control the illumination device 408 to produce a pattern visible on the plurality of keys in response to the display control signal indicating a change in state of the display. The controller 404 may receive a display control signal from the operating system indicating that the display, or alternatively, a backlight associated with the display should be either illuminated or darkened.

The illumination device may be a single device, or similar to FIGS. 1 and 2, include a plurality of illumination devices individually coupled to the plurality of keys. The illumination device or devices may be LEDs or other light emitting devices and may be controlled in a manner suitable to produce a pattern incorporating illumination of the display. Coordinating illumination of the plurality of keys with the illumination of display may produce an intuitive indicator of a computer state. For example, patterns may be used depending on whether the computing system is being turned on or off, or whether a proximity sensor detects a person is approaching or moving away from the computer system. Additionally, a computing system may be configured to turn off a display backlight after a period of inactivity. In response to this signal, a pattern may be displayed on the plurality of keys. This pattern may continually repeat indicating a sleep or hibernation state, as opposed to a powered off state.

Figure 5:
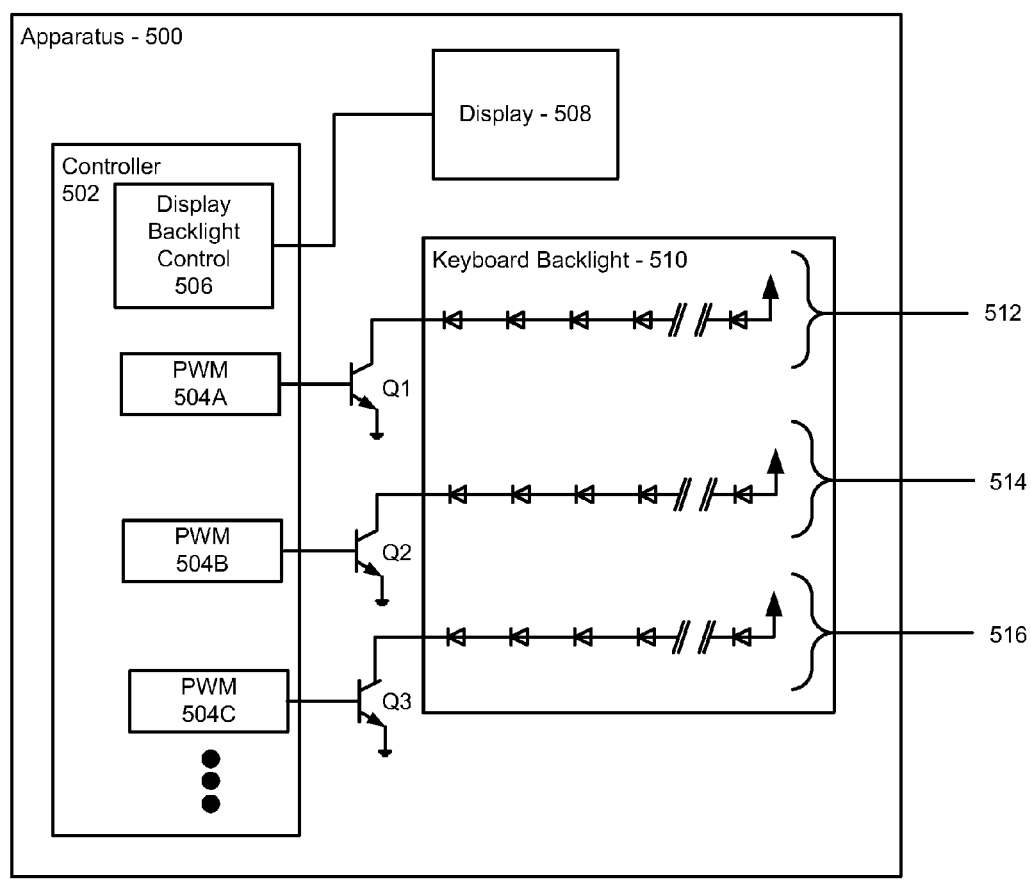
FIG. 5 illustrates an example apparatus in accordance with the present disclosure.

Referring to FIG. 5, an apparatus 500 is illustrated in accordance with the present disclosure. The apparatus 500 includes a controller 502 having a display backlight control 506 and a plurality of PWMs 504A-C. The controller 502 and its various elements are coupled to display 508 and keyboard backlight 510. The keyboard backlight 510 may include a plurality of illumination devices individually coupled to a plurality of keys. The plurality of illumination devices are illustrated as being grouped into a first group 512, a second group 514, and a third grouped 516. More or few groups may be used.

Similar to FIG. 3, the PWMs 504A-C are coupled to the plurality of illumination devices via transistors Q1-Q3, which are configured to turn on and off in accordance with signals from the PWMs 504A-C, thereby producing a pattern across the groups of illumination devices 512, 514, and 516. In contrast to FIG. 3, the controller 502 controls display 508 and the keyboard backlight 510. This may enable incorporation of the illumination and darkening of the display 508 into the pattern.

In one example, controller 502 may receive a signal. The signal may indicate a transition between various states of a computing device. Based on the signal the controller 502 may delay transitions of the display control signal from the display backlight control 506 to the display 508 until the plurality of illumination devices 512, 514, and 516 have produced a pattern. For example, controller 502 may receive a signal from an operating system to power the display 508. The display backlight control 506 may delay the signal while PWM 504C powers group 516, followed by PWM 504B powering group 514, followed by PWM 504A powering group 512. This pattern may visually generate a pattern of light that begins with a first row and moves toward the display 508. In other examples, the groups of illumination devices 512-516 may be arranged in different manners including two rows per grouping.

In another example, controller 502 may receive a signal that indicates a transition from an illuminated state to a low power, darkened state. A low power, darkened state being a state in which neither the display nor the plurality of keys are illuminated. In response, the controller 502 may darken the display 508 via a signal from the display backlight control 506 while the groupings of illumination devices and keys remain illuminated. Following the darkening of the display 508, the controller 502 may selectively control the various groupings 512-516 to darken each row in manner that creates a visual pattern in which the display darkens followed by the various groupings of keys opposite that of the pattern generated upon illuminating the display. Other patterns are contemplated.

Figure 6A:
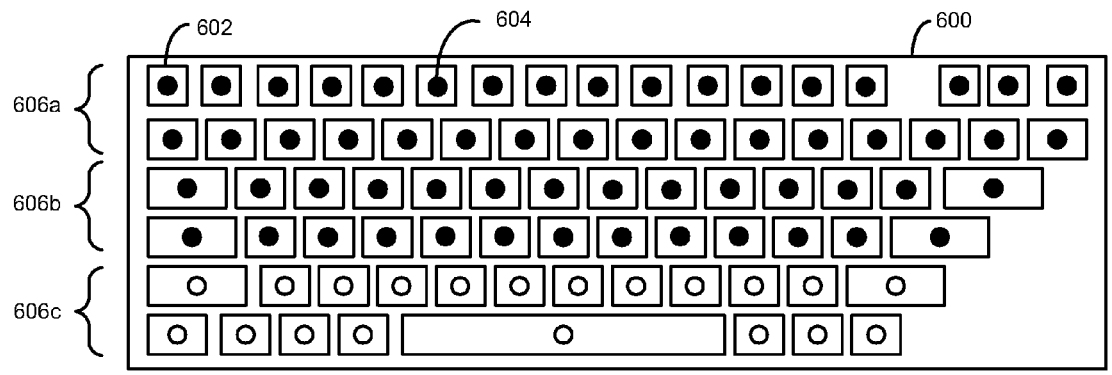
FIGS. 6A-6C illustrate various illumination states of a keyboard in accordance with the present disclosure.
Figure 6B:
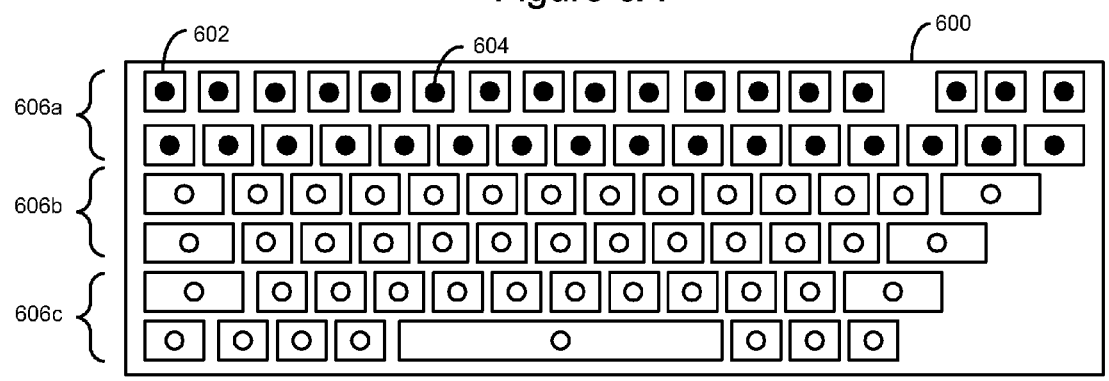
Figure 6C:
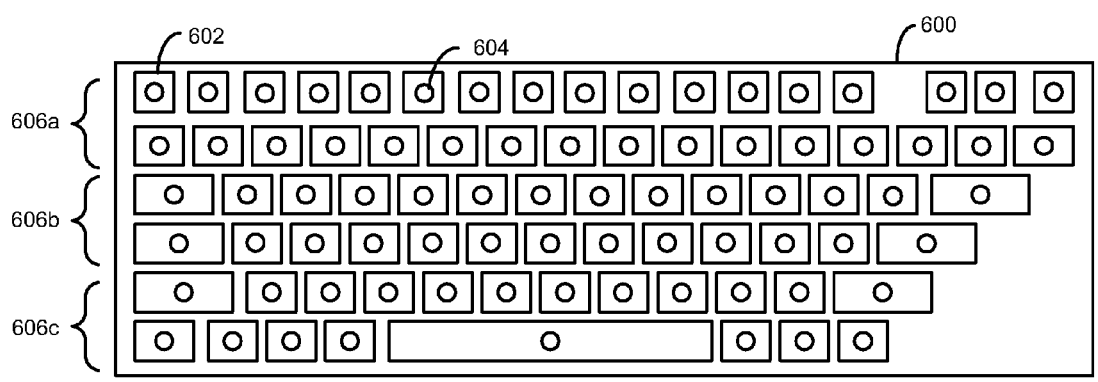

Referring to FIGS. 6A-6C, various patterns of keyboard are illustrated in accordance with various embodiments. The keys of keyboard 600 are grouped in a first group of two rows 606a, a second group of two rows 606b, and a third group of two rows 606c. In FIG. 6A, rows 606a-b are dark while row 606c is lighted. In the next sequence, illustrated in FIG. 6B, rows 606c-b are illuminated while row 606a remains dark. Lastly, in FIG. 6c, the sequence is completed as all the rows are illuminated. After all the rows are illuminated, the display may be illuminated in accordance with the pattern.

Referring to FIGS. 7-12 flow charts are illustrated in accordance with the present disclosure. The flow charts may include operations performed by apparatus or components as described with reference to FIGS. 1-6.

Figure 7:
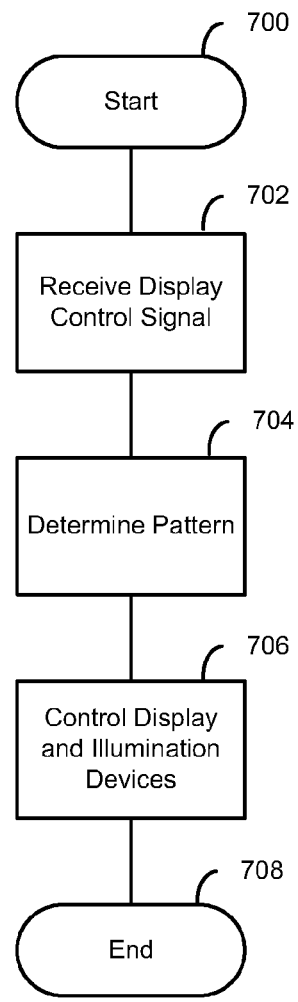

Referring to FIG. 7, the method may begin at 700 and continue to 702 where a controller may receive a display control signal to control illumination of a display. The display control signal may be a signal indicating that a display should be either illuminated or darkened. Based on the display control signal, the controller may determine a pattern for a plurality of illumination devices of a keyboard at 704. The plurality of illumination devices may be individually coupled to a plurality of keys, one illumination device per key. At 706 the controller may control the display and the plurality of illumination devices in accordance with the pattern. The method may then end at 708.

Figure 8:
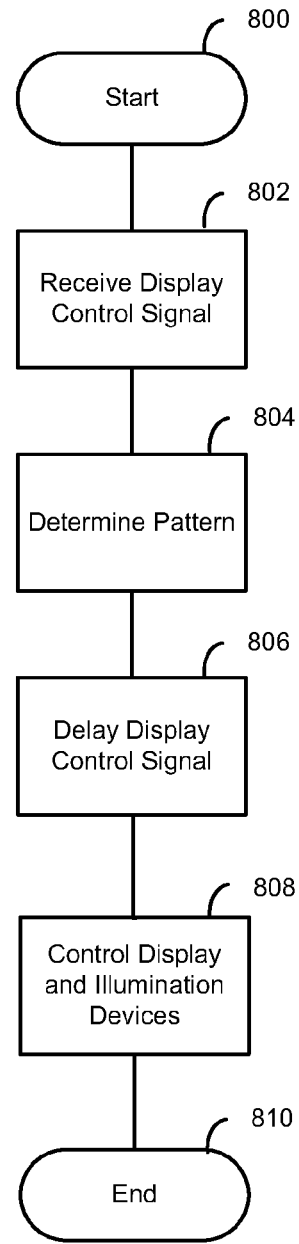

Referring to FIG. 8, the method may begin at 800 and continue to 802 where a controller may receive a display control signal. In response to the display control signal the controller may determine a pattern for the plurality of illumination devices at 804.

Once a pattern for the plurality of illumination devices has been determined at 804, the controller may delay the display control signal at 806. The delay may be for a predetermined amount of time. While the display control signal is delayed, the controller may control plurality of illumination devices in accordance with the predetermined pattern at 808. Once the pattern has been displayed at 808, the display control signal may be used to control the display, and the method may end at 810.

Referring to FIG. 9, the method may begin at 900 and continue to 902 where a controller may receive a display control signal to control illumination of a display. Based on the display control signal, the controller may determine a pattern for the plurality of illumination devices at 904.

Based on the determined pattern, a controller may illuminate a first group of a plurality of illumination devices, and consequently, a plurality of keys at 906. The first group may comprise a single row of illumination devices, a column of illumination devices, a specific related grouping of keys, for example a keypad, or any other feasible grouping of illumination devices and or keys. After illumination of the first group, the controller may illuminate a second group of illumination devices and/or illumination keys at 908. Similar to the first group, the second group of may comprise any number of rows, columns, or related keys. The method may then end at 910.

Referring to FIG. 10, the method may begin at 1000 and continue to 1002 where a controller may receive a display control signal to control illumination of a display. In response to the received display control signal, the controller may determine a pattern for a plurality of illumination devices of a keyboard at 1004, wherein the plurality of illumination devices are individually coupled to a plurality of keys.

With a pattern determined for the plurality of illumination devices determined, the controller may control the plurality of illumination devices and the display in accordance with the pattern. In the example, this may include turning off or darkening the display at 1006. With the display darkened, the controller may continue to implement the pattern by darkening a first group of the plurality of illumination deices and a second group of the plurality of illumination devices at 1008. In various examples, this may generate a visual pattern on the plurality of keys. The method may then end at 1010.

Figure 11:
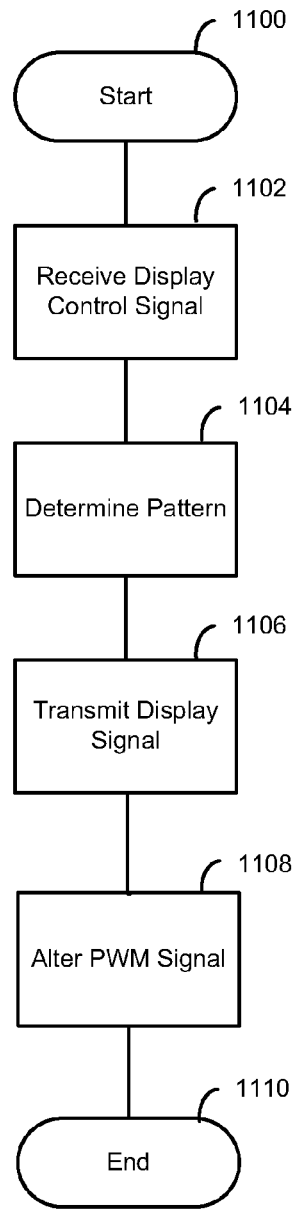

Referring to FIG. 11, the method may begin at 1100 and continue to 1102 where a controller may receive a display control signal to control illumination of a display. In response to the received display control signal, the controller may determine a pattern for the plurality of illumination devices of a keyboard at 1104, wherein the plurality of illumination devices are individually coupled to a plurality of keys.

With a pattern determined for the plurality of illumination devices, the controller may transmit a display control signal to the display at 1106. Transmitting the display control signal may comprise transmitting a control signal to either illuminate the display or darken the display. After transmitting the display control signal to the display, the controller may alter a pulse width of a pulse width modulated signal that is transmitted to the plurality of illumination devices at 1108. Altering the pulse width may alter a brightness of the plurality of illumination devices. Altering the brightness of the plurality of illumination devices may enable a more patterned transition between various groups of the plurality of illumination devices. The method may then end at 1110.

Figure 12:
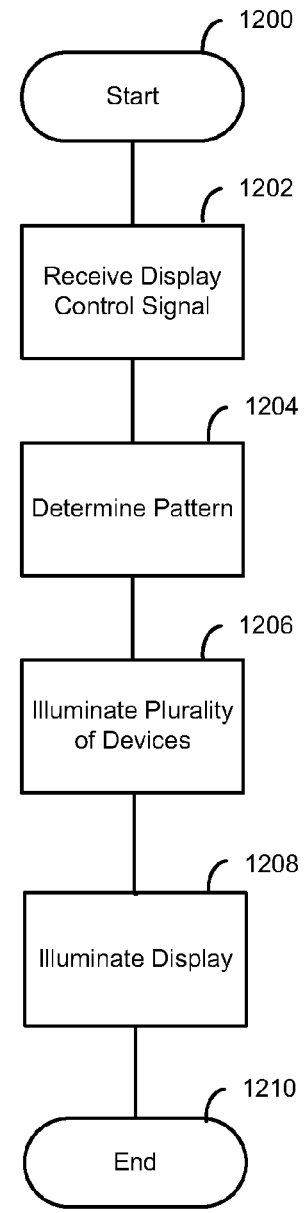

Referring to FIG. 12, the method may begin at 1200 and continue to 1202 where a controller may receive a display control signal to control illumination of a display. In response to the received display control signal, the controller may determine a pattern for the plurality of illumination devices of a keyboard at 1204, wherein the plurality of illumination devices are individually coupled to a plurality of keys.

With a pattern determined for the plurality of illumination devices, the controller may control the illumination of the display and the illumination of the plurality of illumination devices. Controlling the illumination of the display and the illumination devices may include illuminating the plurality of the illumination devices while the display remains in a darkened state at 1206. The illumination of the plurality of illumination devices is in accordance with the determined pattern. After illumination of the illumination devices, the illuminate the display at 1210. Illuminating the display may occur as a final group of the plurality of illumination devices has illuminating thus incorporating the illumination of the display into the pattern. The method may then end at 1210.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. An apparatus, comprising:
a display controller to control illumination of a display with a display control signal in response to a power transition of the apparatus between a sleep state and an active state; and
a keyboard controller coupled to the display controller, wherein the keyboard controller is to control a plurality of illumination devices individually coupled to a plurality of keys of a keyboard to produce a plurality of patterns in response to receipt of the display control signal, wherein a first pattern of the plurality of patterns is indicative of a power transition from the sleep state to the active state and a second pattern of the plurality of patterns is indicative of a power transition from the active state to the sleep state.

2. The apparatus of claim 1, wherein the plurality of patterns comprise an illumination of a first group of the plurality of keys and subsequently an illumination of a second group of the plurality of keys.

3. The apparatus of claim 2, wherein the first group comprises a row of the plurality of keys, and the second group comprises another row of the plurality of keys.

4. The apparatus of claim 2, wherein the first group comprises two rows of the plurality of keys and the second group comprises another two rows of the plurality of keys.

5. The apparatus of claim 2, wherein the pattern comprises an illumination of a third group of the plurality of keys after the illumination of the second group of the plurality of keys.

6. The apparatus of claim 1, wherein the pattern comprises a brightness alteration of a first illuminated group of the plurality of keys followed by a brightness alteration of a second illuminated group of the plurality of keys.

7. The apparatus of claim 1, wherein the keyboard controller is to control the plurality of illumination device to produce the pattern after illumination of the display.

8. A system, comprising:
a display;
a keyboard comprising a plurality of keys and a plurality of illumination devices coupled to the plurality of keys, and
a controller coupled to the display and the keyboard, wherein the controller is to control illumination of the display and the plurality of illumination devices to produce a pattern visible on the display and the keyboard in response to a received display control signal, wherein the display control signal is indicative of a power transition between a sleep state and an active state of the system and wherein th pattern visible on the display and the keyboard indicates the power transition is from the sleep state to the active state or from the active state to the sleep state.

9. The system of claim 8, wherein the controller is to delay transmission of the display control signal to the display to enable illumination of the plurality of keys.

10. The system of claim 8, wherein the pattern comprises an illumination of a first group of the plurality of keys and an illumination of a second group of the plurality of keys.

11. The system of claim 8, wherein the pattern comprises an illumination of a first row of the plurality of keys followed by an illumination of a second row of the plurality of keys and an illumination of the display.

12. The system of claim 8, wherein the pattern comprises a darkening of the display followed by a darkening of the keyboard.

13. The system of claim 8. wherein the controller comprises a pulse width modulator to enable selective illumination of the illumination device.

14. The system of claim 8, wherein the plurality of illumination devices comprise a plurality of light emitting diodes (LEDs).

15. A method, comprising:
receiving, by a controller, a display control signal to control illumination of a display, wherein the display control signal is indicative of a transition between an active state and a sleep state;
determining, by the controller, a pattern for a plurality of illumination devices of a keyboard based on whether the display control signal is indicative of a transition from the active state to the sleep state or the sleep state to the active state, wherein the plurality of illumination devices are individually coupled to a plurality of keys; and
controlling, by the controller, the illumination of the display and the plurality of illumination devices in accordance with the pattern.

16. The method of claim 15, further comprising:
delaying, by the controller, the display control signal for a period of time.

17. The method of claim 15, wherein controlling the illumination of the display and the plurality of illumination devices comprises illuminating a first group of the plurality of illumination devices and a second group of the plurality of illumination devices sequentially.

18. The method of claim 15, wherein controlling the illumination of the display and the plurality of illumination devices comprises darkening the illumination of the display followed by darkening a first group of the plurality of illumination devices and a second group of the plurality of illumination devices.

19. The method of claim 15, wherein controlling the illumination of the display and the plurality of illumination devices comprises transmitting the display control signal to the display and altering a pulse width modulated signal to the plurality of illumination devices.

20. The method of claim 15 wherein controlling the illumination of the display and the plurality of illumination devices comprises illuminating the plurality of illumination devices followed by the display.

* * * * *

UNITED STATES PATENT AND TRADEMARK OFFICE
CERTIFICATE OF CORRECTION

PATENT NO.         : 8,552,985 B2                                        Page 1 of 1
APPLICATION NO.    : 13/149006
DATED              : October 8, 2013
INVENTOR(S)        : Kevin Massaro et al.

It is certified that error appears in the above-identified patent and that said Letters Patent is hereby corrected as shown below:

In the Claims

In column 7, line 47, in Claim 8, delete "keys, and" and insert -- keys; and --, therefor.

In column 7, line 55, in Claim 8, delete "th" and insert -- the --, therefor.

In column 8, line 14, in Claim 13, delete "claim 8." and insert -- claim 8, --, therefor.

Signed and Sealed this
Eighteenth Day of February, 2014

Michelle K. Lee
*Deputy Director of the United States Patent and Trademark Office*